Figure 1:
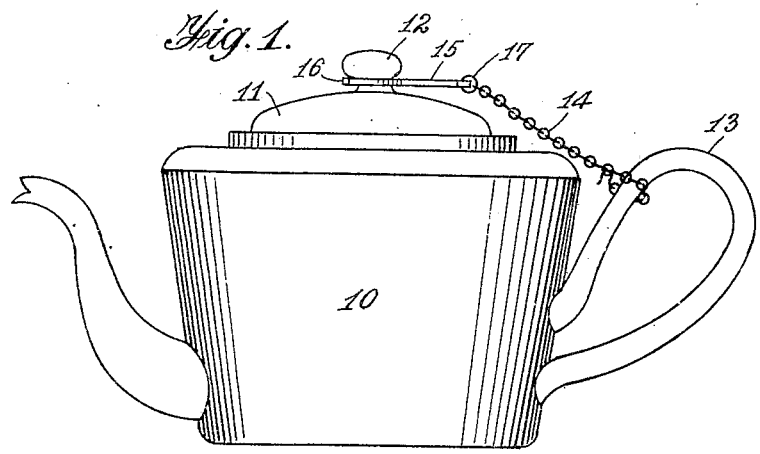

G. H. DOWNES.
FASTENING DEVICE FOR LIDS OF POTS OR VESSELS.
APPLICATION FILED MAY 13, 1919.

1,376,801.

Patented May 3, 1921.

Inventor:
George H. Downes
by Henry T. Bright

UNITED STATES PATENT OFFICE.

GEORGE HENRY DOWNES, OF WOLVERHAMPTON, ENGLAND.

FASTENING DEVICE FOR LIDS OF POTS OR VESSELS.

1,376,801. Specification of Letters Patent. Patented May 3, 1921.

Application filed May 13, 1919. Serial No. 296,955.

*To all whom it may concern:*

Be it known that I, GEORGE HENRY DOWNES, subject of the King of Great Britain, residing at 43 Oxley Lane, Wolverhampton, England, have invented new and useful Fastening Devices for Lids of Pots or Vessels; and I do hereby declare the following to be a full, clear, and exact description of the invention, such as will enable others skilled in the art to which it appertains to make and use the same.

This invention relates to detachable fastening devices for lids of tea, coffee and other pots or vessels to prevent the same from being mislaid or accidentally falling to the floor during use.

In the drawings:—

Figure 1 is a side elevation of a tea-pot showing one form of my invention in position thereon.

Figure 2:
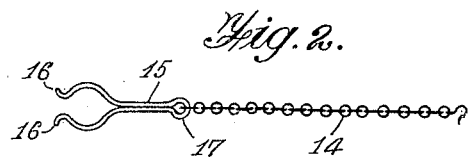

Fig. 2 a plan of the spring clip made use of.

Figure 3:
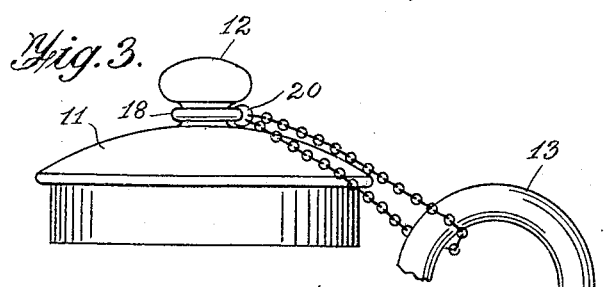

Fig. 3 in side elevation shows the fastening device in the form of a rubber ring.

Figure 4:
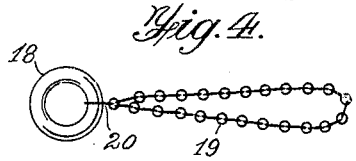

Fig. 4 a plan of the same.

Figure 5:
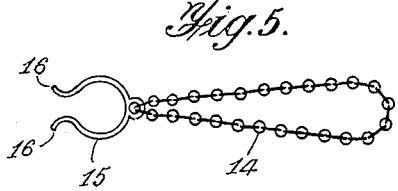
Figure 6:
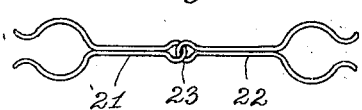

Figs. 5 and 6 in plan show further forms of fastening devices according to my invention.

Referring now particularly to Figs. 1 and 2 of the drawings 10 indicates the tea pot, 11 the lid, 12 the knob or button on the lid and 13 the handle of the tea pot.

The detachable fastening device in this instance comprises a chain 14 secured at one end to the handle 13 and attached at the other end to a spring clip 15 of the form clearly shown in Fig. 2.

To connect the lid 11 with the handle 13 it is only necessary to press the free ends 16 of the spring clip 15 against the reduced neck portion of the knob until the limbs of the clip at their wider and shaped parts embrace said neck portion. When the ends 16 pass the obstruction they automatically close and the lid is held in a secure grip. The chain 14, connected at 17 to the end of the clip 15 is then looped around the handle 13 and fastened thus effectually attaching the lid to the teapot and so prevent all risk of it being mislaid when removed for filling purposes or the like.

When it is, for any reason, desired to detach the device the spring clip is pulled with sufficient strength to force the limbs apart and permit of them being drawn from the knob and the chain is unfastened from the handle when the device may be removed.

In Figs. 3 and 4 a ring of rubber 18 is employed in lieu of the spring clip 15 and a double chain 19 is shown as a means of connecting the same to the handle said chain being threaded through the handle and detachably affixed to the ring 18 at 20.

The ring 18 is made of a size to permit of it being stretched over the knob until encircling the neck of the same when it contracts and effectually grips it.

In Fig. 5 is shown a modified form the salient feature being that in this case the spring clip is stamped or otherwise formed in one piece from sheet metal.

In Fig. 6 I illustrate a further modified form consisting of two metal clips 21 and 22 similar to the clip 15 but with elongated arms which clips are connected together in pairs as at 23, the connection either being direct as by interlocking the two clips together or by means of a flexible medium such as a length of fine chain or the like.

When in position these clips engage the knob 12 and handle 13 respectively of the pot.

What I claim is:—

The combination with a handle and lid of tea, coffee and like pots in which the lid is provided with a knob; of a detachable fastening device for securing the lid to the pot including an expansible rubber ring adapted to be forced over the knob whereby it will contract and be retained on the knob, said ring completely encircling that portion of the knob which it engages, and a flexible element looped through the handle and secured at its two ends to the ring whereby the ring is secured to the pot.

In testimony whereof I have signed my name to this specification in the presence of two subscribing witnesses.

GEORGE HENRY DOWNES.

Witnesses:
 HENRY B. ROBBINS,
 JOHN TAYLOR.